(12) United States Patent
Stocker et al.

(10) Patent No.: US 11,494,291 B2
(45) Date of Patent: Nov. 8, 2022

(54) SYSTEM AND COMPUTER-IMPLEMENTED METHOD FOR ANALYZING TEST AUTOMATION WORKFLOW OF ROBOTIC PROCESS AUTOMATION (RPA)

(71) Applicant: UiPath, Inc., New York, NY (US)

(72) Inventors: Thomas Stocker, Gaishorn (AT); Kartik Iyer, Karnataka (IN); Radhakrishnan Iyer, Karnataka (IN); Naveen Kumar M, Karnataka (IN); Gerd Weishaar, Vienna (AT); Christian Mayer, Vienna (AT)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/082,561

(22) Filed: Oct. 28, 2020

(65) Prior Publication Data
US 2021/0191843 A1    Jun. 24, 2021

Related U.S. Application Data

(63) Continuation-in-part of application No. 16/931,917, filed on Jul. 17, 2020.

(30) Foreign Application Priority Data

Dec. 20, 2019    (IN) .............................. 201911053188

(51) Int. Cl.
*G06F 11/36* (2006.01)

(52) U.S. Cl.
CPC ...... *G06F 11/3684* (2013.01); *G06F 11/3664* (2013.01)

(58) Field of Classification Search
CPC .................... G06F 11/36–3696; G06K 9/6256
See application file for complete search history.

(56) References Cited

U.S. PATENT DOCUMENTS 7,793,154 B2 *  9/2010  Chagoly ............. G06F 9/45512
                                                         703/22
7,900,193 B1    3/2011  Kolawa et al.
(Continued)

FOREIGN PATENT DOCUMENTS

| CN | 107957957 A | * | 4/2018 | .......... G06F 11/3684 |
| CN | 109472496 A | | 3/2019 | |
| KR | 1020190062171 A | | 6/2019 | |

OTHER PUBLICATIONS

Machine Translation of CN CN107957957, Espacenet (online), 2022 [retrieved Feb. 12, 2022], Retrieved from Internet: <URL: https://worldwide.espacenet.com/publicationDetails/description?CC=CN&NR=107957957A&KC=A&FT=D&ND=3&date=20180424&DB=EPODOC&locale=en_EP>, pp. 1-22.*

(Continued)

*Primary Examiner* — Todd Aguilera
(74) *Attorney, Agent, or Firm* — LeonardPatel PC; Sheetal S. Patel; Michael A. Leonard, II

(57) ABSTRACT

A system and a computer-implemented method for analyzing workflow of test automation associated with a robotic process automation (RPA) application are disclosed herein. The computer-implemented method includes receiving the workflow of the test automation associated with the RPA application and analyzing, via an Artificial Intelligence (AI) model associated with a workflow analyzer module, the workflow of the test automation based on a set of pre-defined test automation rules. The computer-implemented method further includes determining one or more metrics associated with the analyzed workflow of the test automation and generating, via the AI model, corrective activity data based on the determined one or more metrics.

20 Claims, 11 Drawing Sheets

(56) References Cited

U.S. PATENT DOCUMENTS

| | | | |
|---|---|---|---|
| 8,365,147 | B2 | 1/2013 | Grechanik et al. |
| 8,381,184 | B2 * | 2/2013 | Johnson .............. G06F 11/3676 |
| | | | 717/124 |
| 8,561,021 | B2 | 10/2013 | Muharsky et al. |
| 9,274,782 | B2 | 3/2016 | Adderly et al. |
| 9,753,839 | B2 | 9/2017 | Balakrishnan et al. |
| 10,223,240 | B2 | 3/2019 | Bhojan |
| 10,699,193 | B2 | 6/2020 | Guo et al. |
| 11,003,568 | B2 * | 5/2021 | Smith ................... G06F 11/366 |
| 2008/0133210 | A1 | 6/2008 | Chagoly et al. |
| 2010/0058295 | A1 * | 3/2010 | Johnson .............. G06F 11/3676 |
| | | | 717/124 |
| 2012/0116836 | A1 | 5/2012 | Flores et al. |
| 2014/0279764 | A1 | 9/2014 | Lahr |
| 2014/0351642 | A1 | 11/2014 | Bates et al. |
| 2015/0261796 | A1 | 9/2015 | Gould et al. |
| 2016/0275628 | A1 | 9/2016 | Mishra et al. |
| 2017/0330109 | A1 | 11/2017 | Maughan et al. |
| 2018/0052666 | A1 * | 2/2018 | Zhang ................. G06F 11/3668 |
| 2018/0074931 | A1 | 3/2018 | Garcia et al. |
| 2019/0129827 | A1 | 5/2019 | Ramasamy et al. |
| 2019/0140855 | A1 | 5/2019 | Venugopal et al. |
| 2019/0155572 | A1 | 5/2019 | Misra et al. |
| 2019/0171940 | A1 | 6/2019 | Guo et al. |
| 2020/0034279 | A1 | 1/2020 | Shivam et al. |
| 2020/0073788 | A1 | 3/2020 | Saha et al. |
| 2020/0097389 | A1 * | 3/2020 | Smith ................. G06F 11/3612 |
| 2021/0191367 | A1 * | 6/2021 | Iyer ....................... B25J 9/1605 |

OTHER PUBLICATIONS

International Search Report & Written Opinion dated Mar. 16, 2021, PCT Patent Application No. PCT/US20/64832.

International Search Report & Written Opinion, dated Apr. 15, 2021, PCT Application No. PCT/US20/64838.

Todd Aguilera, "Non-Final Office Action", dated Mar. 29, 2022, U.S. Appl. No. 16/931,917.

"Comparing Different Versions of a Workflow or Task UI", Oracle, 2013.

Barre, Gerald, "Comparing Files Using Visual Studio", Mar. 12, 2018, https://www.meziantou.net/comparing-files-using-visual-studio.htm.

Zhang, Ji, et al., "Flow Recommender", Computer Science, 2009.

Todd Aguilera, "Final Office Action", dated Jul. 7, 2022, U.S. Appl. No. 16/931,917.

* cited by examiner

SYSTEM AND COMPUTER-IMPLEMENTED METHOD FOR ANALYZING TEST AUTOMATION WORKFLOW OF ROBOTIC PROCESS AUTOMATION (RPA)

CROSS-REFERENCE TO RELATED APPLICATIONS

This application is a continuation-in-part of U.S. Non-Provisional patent application Ser. No. 16/931,917, filed Jul. 17, 2020, entitled "SYSTEM AND COMPUTER-IMPLEMENTED METHOD FOR ANALYZING A ROBOTIC PROCESS AUTOMATION (RPA) WORKFLOW," which claims priority to Indian Patent Application No. 201911053188, filed Dec. 20, 2020, the entire contents of which are herein incorporated by reference.

FIELD

The present invention generally relates to robotic process automation (RPA), and more specifically, to analyzing test automation workflows for RPA.

BACKGROUND

Generally, RPA allows automation of simple and repeated tasks of manual user inputs to a computing system. The manual user inputs are now being increasingly performed by software robots using RPA tools. RPA facilitates the proliferation of software automation due to its execution of relatively simple, repeatable tasks that exist in large numbers within an enterprise. Currently, RPA tools are available which help a software developer to design, execute, deploy, and test the simple tasks and repeated tasks of the enterprise. For example, these tasks are designed using designer tools and deployed using deployment tools. There are several designer tools (such as software tools) to design workflows for the simple tasks and repeated tasks in an RPA application. Further, there are several software tools for testing such RPA applications by use of test automation.

However, these software tools lack in analyzing a workflow for identifying and removing potential flaws in the test automation. For instance, a developer develops the test automation in the software tool. The developed test automation is forwarded to a testing team to identify. The testing team later reverts back with the flaws. This requires manual testing of the test automation, which is a time consuming and costly procedure. Further, debugging of the flaws in the test automation workflows at real-time in order to avoid the flaws at run-time are more challenging.

Accordingly, there is a need for a software tool that allows the developer to design workflow of test automation of an RPA application and debug the flaws in the workflow of the test automation at design stage.

SUMMARY

Certain embodiments of the present invention provide solutions to the problems and needs in the art that have not yet been fully identified, appreciated, or solved by current RPA technologies. For example, some embodiments of the present invention pertain to an analysis of a workflow of test automation of a RPA application for identifying and removing potential flaws or errors.

In an embodiment, a computer-implemented method for analyzing workflow of test automation associated with a robotic process automation (RPA) application, is disclosed. The computer-implemented method includes receiving a workflow of the test automation associated with the RPA application. The computer-implemented method includes analyzing, via an AI model associated with the workflow analyzer module, the workflow of the test automation based on a set of pre-defined test automation rules. The computer-implemented method also includes determining one or more metrics associated with the analyzed workflow of the test automation. The computer-implemented method further include generating, via the AI model, corrective activity data based on the determined one or more metrics.

In another embodiment, a system for analyzing workflow of test automation associated with a robotic process automation (RPA) application, is disclosed. The system comprises at least one processor and memory storing instructions. The instructions are configured to cause the at least one processor to receive a workflow of the test automation associated with the RPA application and analyze, via an AI model associated with a workflow analyzer module, the workflow of the test automation based on a set of pre-defined test automation rules. The computer program instructions are further configured to cause the at least one processor to determine one or more metrics associated with the analyzed workflow of the test automation and generate, via the AI model, corrective activity data based on the determined one or more metrics.

In yet another embodiment, a computer program embodied on a non-transitory computer-readable medium. The program is configured to cause at least one or more processors to receive a workflow of test automation associated with an RPA application and analyze, via an AI model associated with a workflow analyzer module, the workflow of the test automation based on a set of pre-defined test automation rules. The program is further configured to cause the one or more processors to determine one or more metrics associated with the analyzed test automation and generate, via the AI model, corrective activity data based on the determined one or more metrics.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to a system (hereinafter referred to as a "computing system") configured to analyze workflow of test automation associated with a RPA application for identifying and removing potential flaws in test automation workflow (also called as "workflow of test automation") of the RPA. In some embodiments, the computing system receives the workflow of the test automation from a design module and analyzes the received workflow for identifying and removing the flaws. For example, the computing system uses Artificial Intelligence (AI) model to analyze the workflow based on a set of pre-defined test automation rules. The AI model is pre-trained with standard workflows of test automation, all possible errors in the workflows, and standard robotic enterprise framework documents. In some example embodiments, standard RPA workflows or any RPA workflows are converted into test cases or imported as test cases from test automation projects for training the AI model. From the analyzed workflow of the test automation, one or more metrics are determined for generating corrective activity data.

In some embodiments, the AI model generates corrective activity data based on the one or more determined metrics. The corrective activity data is used for performing corrective activity for the analyzed workflow of the test automation. The corrective activity data includes suggestion-messages (e.g., assertions) or details instructing a user (e.g., a developer or a tester) on how to perform the corrective activity for the analyzed workflow. The modified test automation file is configured to have improved execution time and storage requirements in comparison with the received workflow of the test automation. Further, the improvements in execution time and storage requirements reduce computational overhead on the computing system. In this way, the workflow of the test automation is analyzed to debug the flaws prior to deployment, using the computing system and the computer-implemented method disclosed herein.

Figure 1:
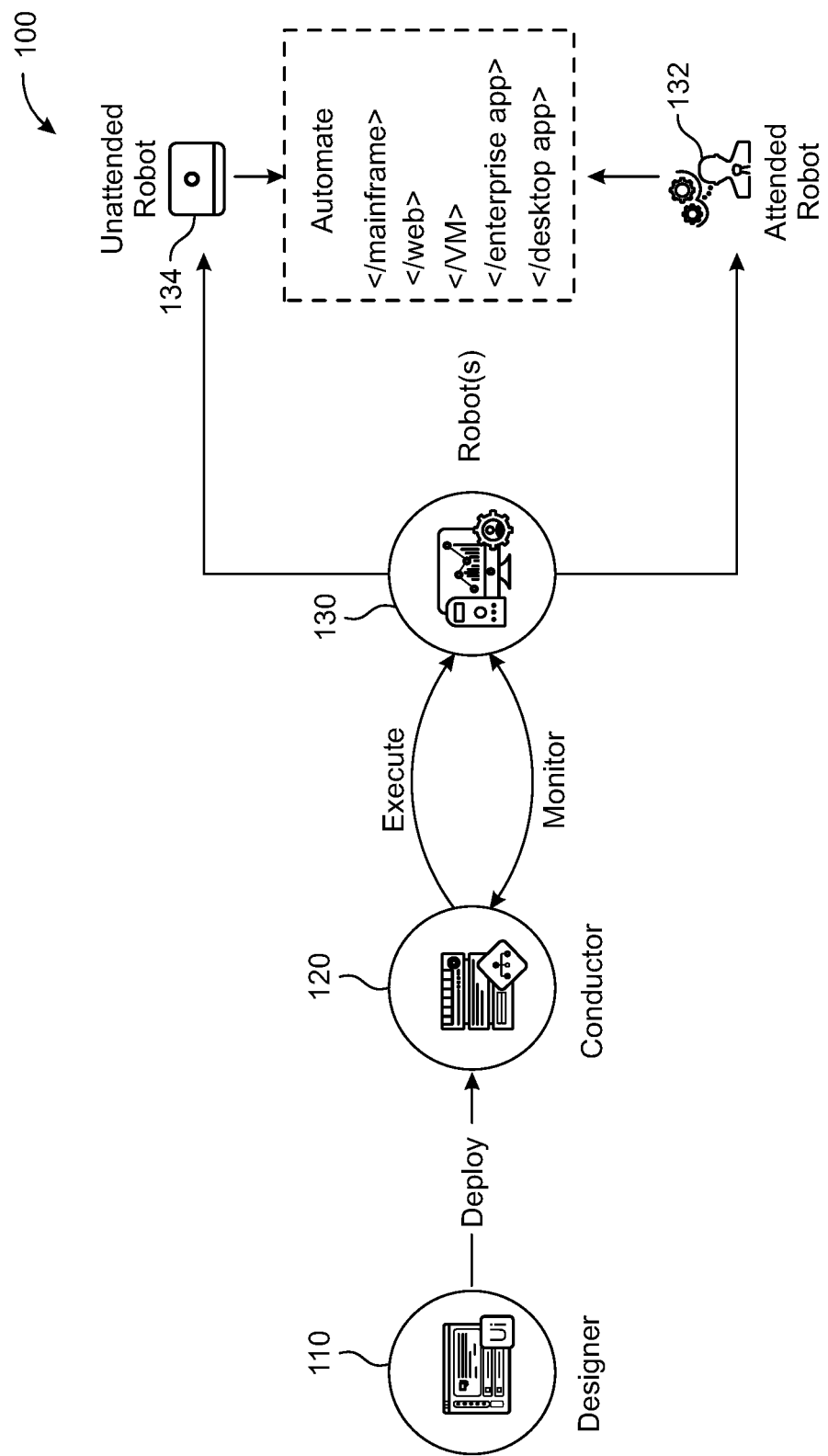
FIG. 1 is an architectural diagram illustrating an RPA system, according to an embodiment of the present invention.

FIG. 1 is an architectural diagram illustrating an RPA system 100, according to an embodiment of the present invention. The RPA system 100 includes a designer 110 that allows a developer or a user to design and implement workflows. The designer 110 provides a solution for application integration, as well as automating third-party applications, administrative Information Technology (IT) tasks, and business IT processes. The designer 110 facilitates development of an automation project, which is a graphical representation of a business process. Simply put, the designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of the designer 110 is UiPath Studio™. Each activity includes an action, such as clicking a button, reading a file, writing to a log panel, etc. In some embodiments, workflows are nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow of test automation. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which is triggered by a condition (i.e., transition) or an activity. Global exception handlers are particularly suitable for determining workflow behavior when encountering an execution error and for debugging processes.

Once a workflow is developed in the designer 110, execution of business processes is orchestrated by a conductor 120, which orchestrates one or more robots 130 that execute the workflows developed in the designer 110. One commercial example of an embodiment of the conductor 120 is UiPath Orchestrator™. The conductor 120 facilitates management of the creation, monitoring, and deployment of resources in an environment. The conductor 120 acts as an integration point with third-party solutions and applications.

The conductor 120 manages a fleet of robots 130, connecting and executing the robots 130 from a centralized point. Types of robots 130 that managed include, but are not limited to, attended robots 132, unattended robots 134, development robots (similar to the unattended robots 134, but used for development and testing purposes), and non-production robots (similar to the attended robots 132, but used for development and testing purposes). The attended robots 132 are triggered by user events and operate alongside a human on the same computing system. The attended robots 132 are used with the conductor 120 for a centralized process deployment and logging medium. The attended robots 132 help a human user accomplish various tasks, and are triggered by the user events. In some embodiments, processes are not started from the conductor 120 on this type of robot and/or they are not run under a locked screen. In certain embodiments, the attended robots 132 are started from a robot tray or from a command prompt. The attended robots 132 run under human supervision in some embodiments.

The unattended robots 134 run unattended in virtual environments and automate many processes. The unattended robots 134 are responsible for remote execution, monitoring, scheduling, and providing support for work queues. Debugging for all robot types run in the designer 110 in some embodiments. Both the attended robots 132 and the unattended robots 134 automates various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

The conductor 120 have various capabilities including, but not limited to, provisioning, deployment, configuration, queuing, monitoring, logging, and/or providing interconnectivity. Provisioning includes creating and maintenance of connections between the robots 130 and the conductor 120 (e.g., a web application). Deployment includes assuring the correct delivery of package versions to the assigned robots 130 for execution. Configuration includes maintenance and delivery of robot environments and process configurations. Queuing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch®, which provides an ability to store and quickly query large datasets). The conductor 120 provides interconnectivity by acting as the centralized point of communication for the third-party solutions and/or applications.

The robots 130 include execution agents that run workflows built in the designer 110. One commercial example of some embodiments of the robot(s) 130 is UiPath Robots™. In some embodiments, the robots 130 install the Microsoft Windows® Service Control Manager (SCM)-managed service by default. As a result, the robots 130 opens interactive Windows® sessions under the local system account, and have rights of a Windows® service.

In some embodiments, the robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of the robots 130 is configured in an HD environment.

The robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for the robots 130. A console application is launched by the SCM under the local system.

User mode robot services in some embodiments manage and monitor Windows® sessions and act as a proxy between the conductor 120 and the execution hosts. The user mode robot services are trusted with and manage the credentials for the robots 130. A Windows® application is automatically launched if the SCM-managed robot service is not installed.

Executors run given jobs under a Windows® session (i.e., they execute workflows). The executors are aware of per-monitor dots per inch (DPI) settings. Agents include Windows® Presentation Foundation (WPF) applications that display the available jobs in the system tray window. The agents include a client of the service. The agents send a request to start or stop jobs and change settings. The command line is a client of the service. The command line is a console application that requests to start jobs and waits for their output.

Having components of the robots 130 split as explained above helps developers, support users, and computing systems more easily run, identify, and track what each component is executing. Special behaviors are configured per component this way, such as setting up different firewall rules for the executor and the service. The executor is always aware of the DPI settings per monitor in some embodiments. As a result, the workflows are executed at any DPI, regardless of the configuration of the computing system on which they were created. Projects from the designer 110 are also independent of a browser zoom level in some embodiments. For applications that are DPI-unaware or intentionally marked as unaware, DPI is disabled in some embodiments.

Figure 2:
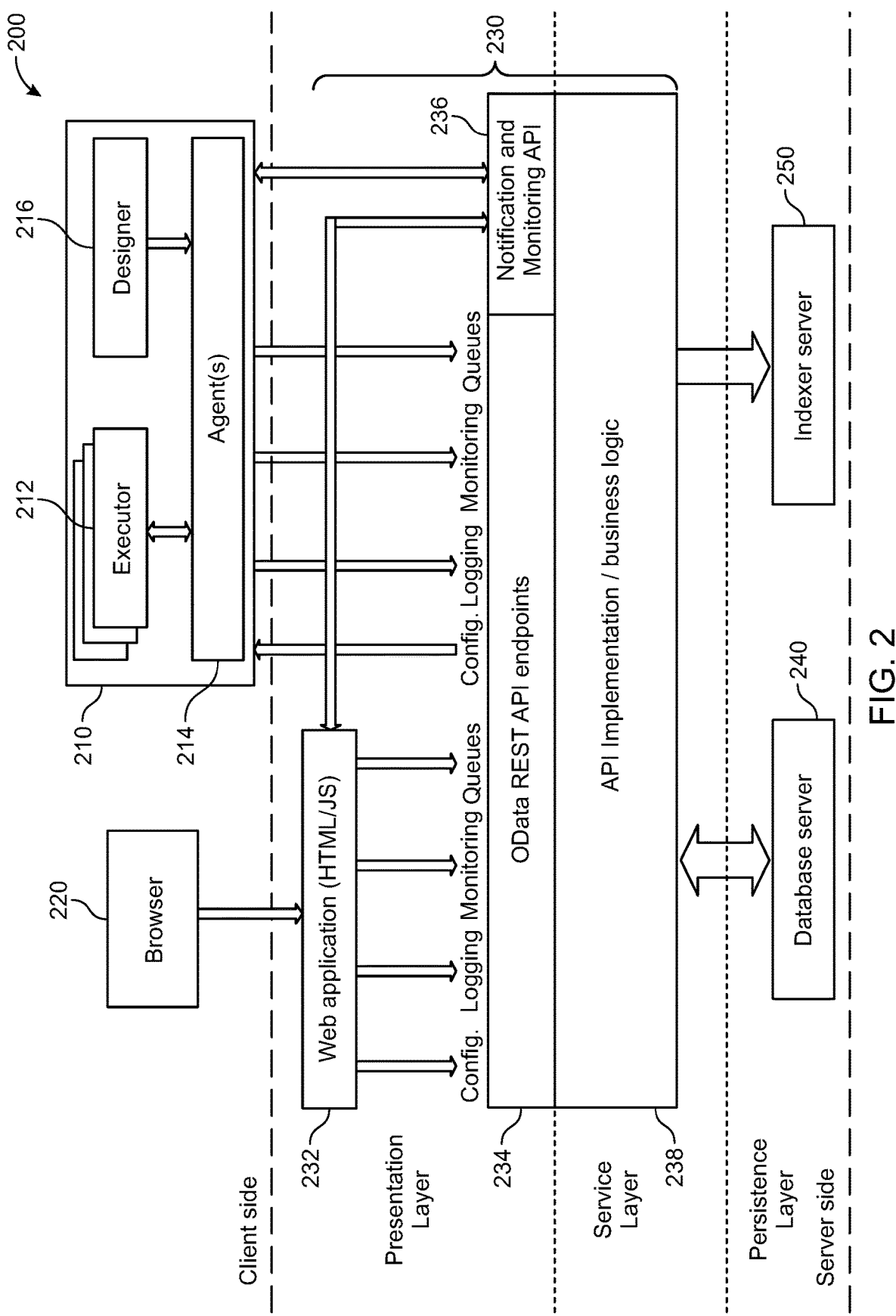
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, the RPA system 200 is, or is not a part of, the RPA system 100 of FIG. 1. It should be noted that a client side, a server side, or both, includes any desired number of the computing systems without deviating from the scope of the invention. On the client side, a robot application 210 includes executors 212, an agent 214, and a designer 216 (for instance, the designer 110). However, in some embodiments, the designer 216 is not running on the robot application 210. The executors 212 are running processes. Several business projects (i.e. the executors 212) run simultaneously, as shown in FIG. 2. The agent 214 (e.g., the Windows® service) is the single point of contact for all the executors 212 in this embodiment. All messages in this embodiment is logged into a conductor 230, which processes them further via a database server 240, an indexer server 250, or both. As discussed above with respect to FIG. 1, the executors 212 are robot components.

In some embodiments, a robot represents an association between a machine name and a username. The robot manages multiple executors at the same time. On computing systems that support multiple interactive sessions running simultaneously (e.g., Windows® Server 2012), the multiple robots are running at the same time, each in a separate Windows® session using a unique username. This is referred to as HD robots above.

The agent 214 is also responsible for sending the status of the robot (e.g., periodically sending a "heartbeat" message indicating that the robot is still functioning) and downloading the required version of the package to be executed. The communication between the agent 214 and the conductor 230 is always initiated by the agent 214 in some embodiments. In the notification scenario, the agent 214 opens a WebSocket channel that is later used by the conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. The conductor 230 includes the web application 232, the OData REST API endpoints 234, the notification and monitoring API 236, and the API implementation/business logic 238. In some embodiments, most actions that a user performs in an interface of the conductor 220 (e.g., via a browser 220) are performed by calling various APIs. Such actions include, but are not limited to, starting jobs on robots, adding/removing data in queues, scheduling jobs to run unattended, etc. without deviating from the scope of the invention. The web application 232 is the visual layer of the server platform. In this embodiment, the web application 232 uses Hypertext Markup Language (HTML) and JavaScript (JS). However, any desired markup language, script language, or any other format is used without deviating from the scope of the invention. The user interacts with web pages from the web application 232 via the browser 220 in this embodiment in order to perform various actions to control the conductor 230. For instance, the user creates robot groups, assign packages to the robots, analyze logs per robot and/or per process, start and stop robots, etc.

In addition to the web application 232, the conductor 230 also includes service layer that exposes the OData REST API endpoints 234. However, other endpoints are included without deviating from the scope of the invention. The REST API is consumed by both the web application 232 and the agent 214. The agent 214 is the supervisor of the one or more robots on the client computer in this embodiment.

The REST API in this embodiment covers configuration, logging, monitoring, and queuing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queuing REST endpoints are responsible for queues and queue item management, such as adding data to a queue, obtaining a transaction from the queue, setting the status of a transaction, etc.

Monitoring REST endpoints monitor the web application 232 and the agent 214. The notification and monitoring API 236 is associated with REST endpoints that are used for registering the agent 214, delivering configuration settings to the agent 214, and for sending/receiving notifications from the server and the agent 214. The notification and monitoring API 236 also uses WebSocket communication in some embodiments.

The persistence layer includes a pair of servers in this embodiment—the database server 240 (e.g., a SQL server) and the indexer server 250. The database server 240 in this embodiment stores the configurations of the robots, robot groups, associated processes, users, roles, schedules, etc. This information is managed through the web application 232 in some embodiments. The database server 240 manages queues and queue items. In some embodiments, the database server 240 stores messages logged by the robots (in addition to or in lieu of the indexer server 250).

The indexer server 250, which is optional in some embodiments, stores and indexes the information logged by the robots. In certain embodiments, the indexer server 250 is disabled through the configuration settings. In some embodiments, the indexer server 250 uses ElasticSearch®, which is an open source project full-text search engine. The messages logged by robots (e.g., using activities like log message or write line) are sent through the logging REST endpoint(s) to the indexer server 250, where they are indexed for future utilization.

Figure 3:
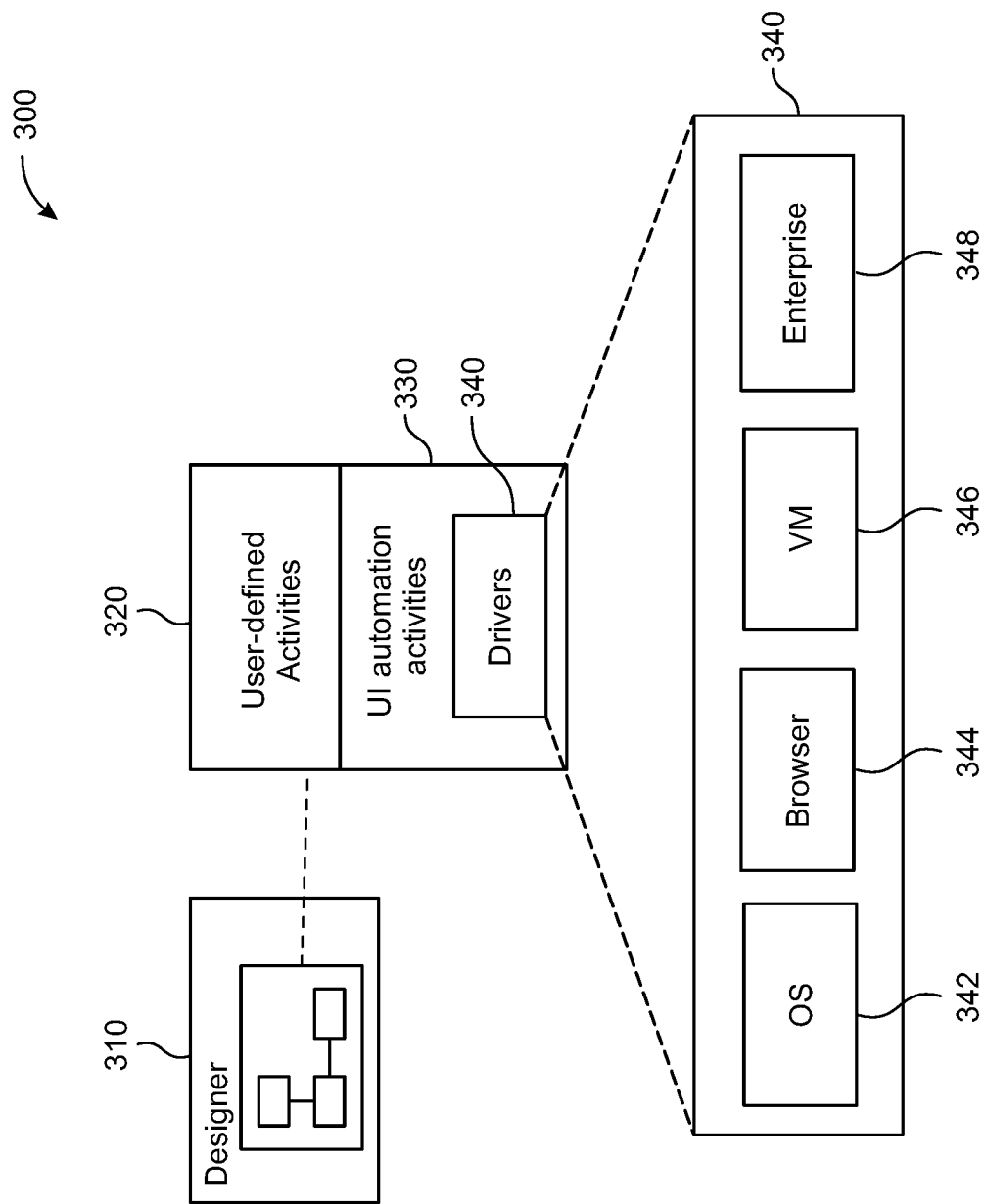
FIG. 3 is an architectural diagram illustrating the relationship between a designer, activities, and drivers, according to an embodiment of the present invention.

FIG. 3 is an architectural diagram illustrating a relationship 300 between a designer 310, user-defined activities 320, User Interface (UI) automation activities 330, and drivers 340, according to an embodiment of the present invention. Per the above, a developer uses the designer 310 to develop workflows that are executed by robots. According to some embodiments, the designer 310 is a design module of an integrated development environment (IDE), which allows the user or the developer to perform one or more functionalities related to the workflows. The functionalities include editing, coding, debugging, browsing, saving, modifying and the like for the workflows. In some example embodiments, the designer 310 facilitates in analyzing the workflows. Further, in some embodiments, the designer 310 is configured to compare two or more workflows, such as in a multi-window user interface. The workflows include user-defined activities 320 and UI automation activities 330. Some embodiments are able to identify non-textual visual components in an image, which is called computer vision (CV) herein. Some CV activities pertaining to such components include, but are not limited to, click, type, get text, hover, element exists, refresh scope, highlight, etc. The click in some embodiments identifies an element using CV, optical character recognition (OCR), fuzzy text matching, and multi-anchor, for example, and clicks it. The type identifies an element using the above and types in the element. The get text identifies the location of specific text and scans it using the OCR. The hover identifies an element and hover over it. The element exists check whether an element exists on the screen using the techniques described above. In some embodiments, there are hundreds or even thousands of activities that are implemented in the designer 310. However, any number and/or type of activities are available without deviating from the scope of the invention.

The UI automation activities 330 are a subset of special, lower level activities that are written in lower level code (e.g., CV activities) and facilitate interactions with the screen. In some embodiments, the UI automation activities 330 include activities, which are related to debugging flaws or correcting flaws in the workflows. The UI automation activities 330 facilitate these interactions via the drivers 340 that allow the robot to interact with the desired software. For instance, the drivers 340 include Operating System (OS) drivers 342, browser drivers 344, VM drivers 346, enterprise application drivers 348, etc.

The drivers 340 interacts with the OS drivers 342 at a low level looking for hooks, monitoring for keys, etc. They facilitate integration with Chrome®, IE®, Citrix®, SAP®, etc. For instance, the "click" activity performs the same role in these different applications via the drivers 340. The drivers 340 enable execution of an RPA application in an RPA system.

Figure 4:
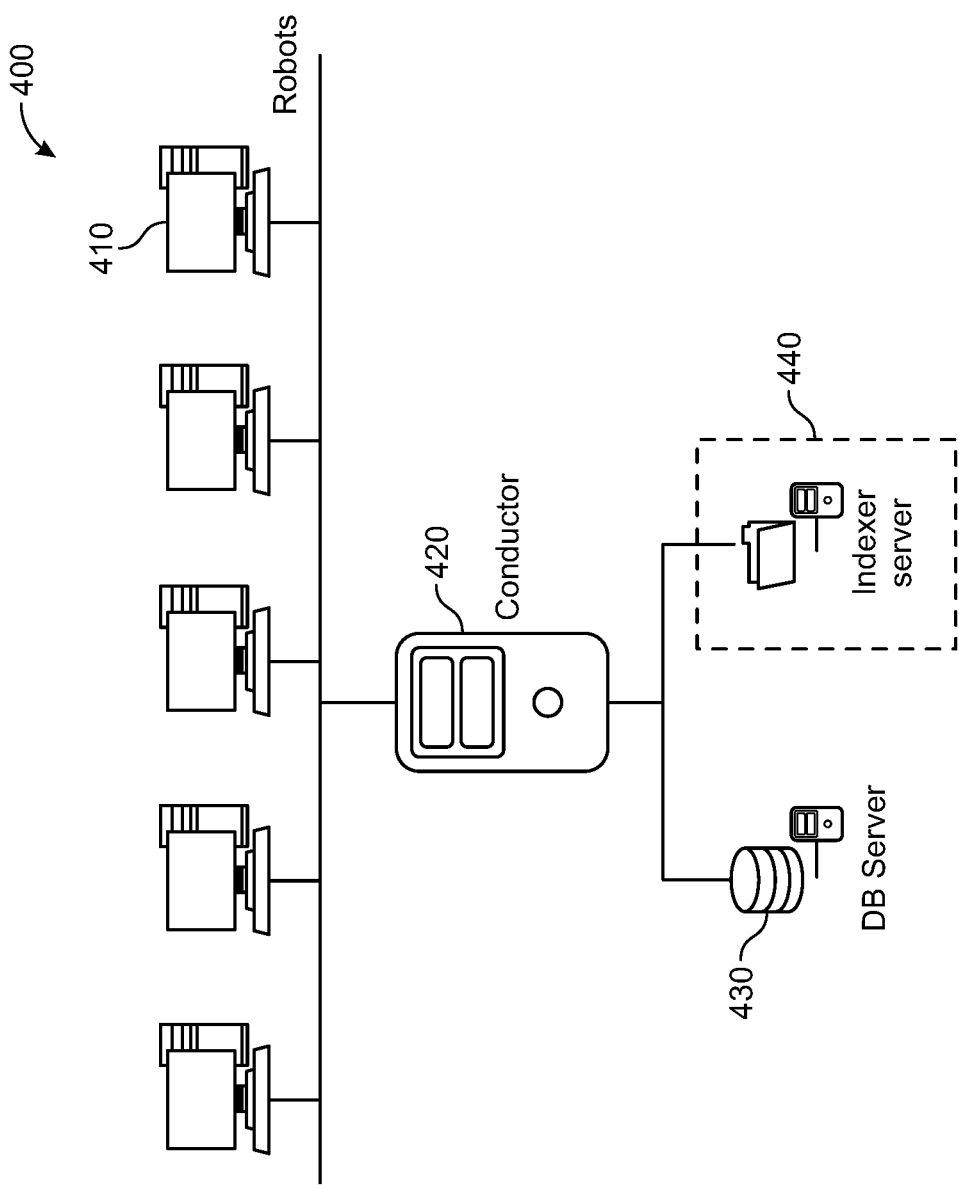
FIG. 4 is an architectural diagram illustrating another RPA system, according to an embodiment of the present invention.

FIG. 4 is an architectural diagram illustrating an RPA system 400, according to an embodiment of the present invention. In some embodiments, the RPA system 400 includes the RPA systems 100 and/or 200 of FIGS. 1 and/or 2. The RPA system 400 includes multiple client computing systems 410 (for instance, running robots). In some embodiments, the multiple client computing systems 410 are configured to analyze the workflows. Further, the analyzed workflows are deployed in the multiple client computing systems 410. The computing systems 410 communicate with a conductor computing system 420 via a web application running thereon. The conductor computing system 420, in turn, communicates with a database server 430 (for instance, the database server 240) and an optional indexer server 440 (for instance, the optional indexer server 250).

With respect to the FIGS. 1 and 3, it should be noted that while the web application is used in these embodiments, any suitable client/server software is used without deviating from the scope of the invention. For instance, the conductor runs a server-side application that communicates with non-web-based client software applications on the client computing systems.

Figure 5:
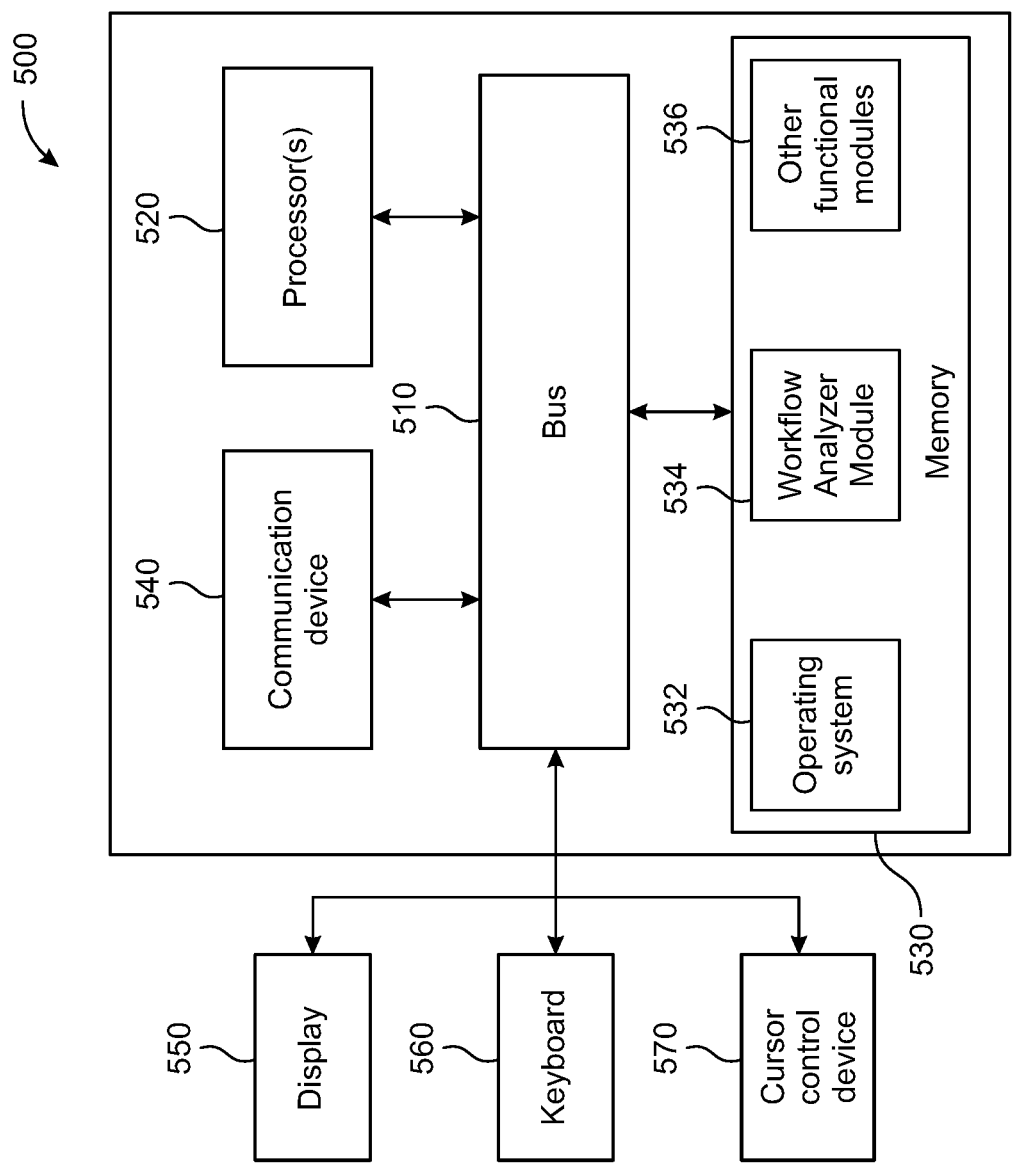
FIG. 5 is an architectural diagram illustrating a computing system configured to analyze workflow of test automation associated with an RPA application, according to an embodiment of the present invention.

FIG. 5 is an architectural diagram illustrating a computing system 500 configured to analyze workflow of test automation associated with an RPA application, according to an embodiment of the present invention. In some embodiments, the computing system 500 includes one or more of the computing systems depicted and/or described herein. The computing system 500 includes a bus 510 or other communication mechanism for communicating information, and processor(s) 520 coupled to the bus 510 for processing information. The processor(s) 520 includes any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. The processor(s) 520 also has multiple processing cores, and at least some of the cores are configured to perform specific functions. Multi-parallel processing is used in some embodiments. In certain embodiments, at least one of the processor(s) 520 is a neuromorphic circuit that includes processing elements that mimic biological neurons. In some embodiments, neuromorphic circuits do not require the typical components of a Von Neumann computing architecture.

The computing system 500 further includes a memory 530 for storing information and instructions to be executed by the processor(s) 520. The memory 530 is comprised of any combination of Random Access Memory (RAM), Read Only Memory (ROM), flash memory, cache, static storage such as a magnetic or optical disk, or any other types of non-transitory computer-readable media or combinations thereof. The non-transitory computer-readable media is any available media that is accessible by the processor(s) 520 and includes volatile media, non-volatile media, or both. The media also includes removable, non-removable, or both.

Additionally, the computing system 500 includes a communication device 540, such as a transceiver, to provide access to a communications network via a wireless and/or wired connection. In some embodiments, the communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beamsteering, a combination thereof, and or any other antenna configuration without deviating from the scope of the invention.

The processor(s) 520 are further coupled via the bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. The display 550 is configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O is used without deviating from the scope of the invention.

A keyboard 560 and a cursor control device 570, such as a computer mouse, a touchpad, etc., are further coupled to the bus 510 to enable a user to interface with computing system. However, in certain embodiments, a physical keyboard and mouse are not present, and the user interacts with the device solely through the display 550 and/or a touchpad (not shown). Any type and combination of input devices are used as a matter of design choice. In certain embodiments, no physical input device and/or display is present. For instance, the user interacts with the computing system 500 remotely via another computing system in communication therewith, or the computing system 500 operates autonomously.

The memory 530 stores software modules that provide functionality when executed by the processor(s) 520. The modules include an operating system 532 for the computing system 500. The modules further include a workflow analyzer module 534 that is configured to perform all or part of the processes described herein or derivatives thereof. The computing system 500 also includes one or more additional functional modules 536 that include additional functionality. In some embodiments, the workflow analyzer module 534 is configured to analyze test automation created for software applications. The workflow analyzer module 534 is also configured to validate configuration of all activities, check for missing data, incorrect data, and/or the like.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein are implemented in localized and distributed forms consistent with computing technology, including cloud computing systems.

It should be noted that some of the system features described in this specification have been presented as modules, in order to more particularly emphasize their implementation independence. For example, a module is implemented as a hardware circuit comprising custom very large scale integration (VLSI) circuits or gate arrays, off-the-shelf semiconductors such as logic chips, transistors, or other discrete components. A module is also implemented in programmable hardware devices such as field programmable gate arrays, programmable array logic, programmable logic devices, graphics processing units, or the like.

A module is also at least partially implemented in software for execution by various types of processors. An identified unit of executable code, for instance, includes one or more physical or logical blocks of computer instructions that, for instance, be organized as an object, procedure, or function. Nevertheless, the executables of an identified module need not be physically located together, but include disparate instructions stored in different locations that, when joined logically together, comprise the module and achieve the stated purpose for the module. Further, modules are stored on a computer-readable medium, which are, for instance, a hard disk drive, flash device, RAM, tape, and/or any other such non-transitory computer-readable medium used to store data without deviating from the scope of the invention.

Indeed, a module of executable code could be a single instruction, or many instructions, and even distributed over several different code segments, among different programs, and across several memory devices. Similarly, operational data is identified and illustrated herein within modules, and embodied in any suitable form and organized within any suitable type of data structure. The operational data is collected as a single data set, or distributed over different locations including over different storage devices, and exists, at least partially, merely as electronic signals on a system or network.

Figure 6:
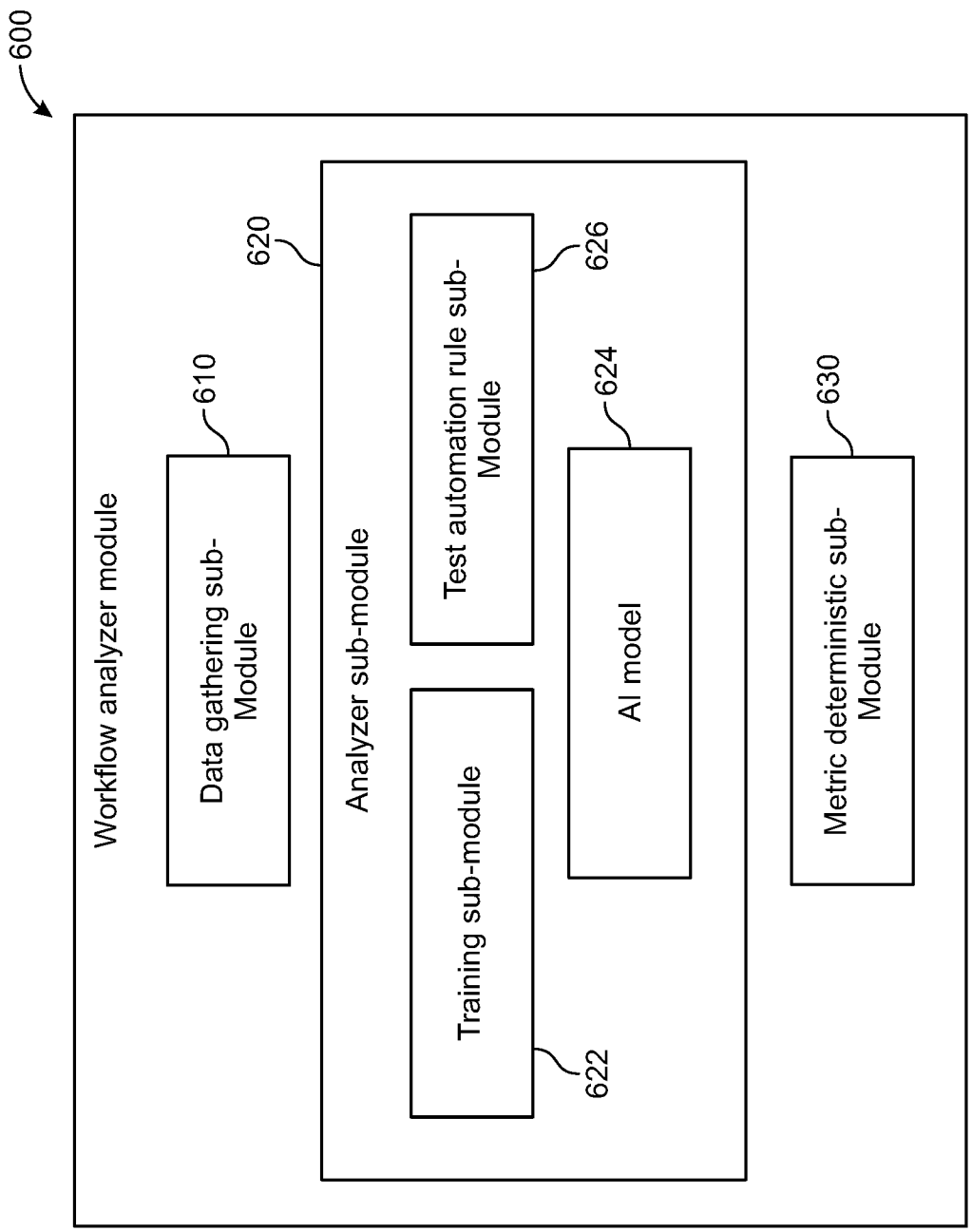
FIG. 6 is an architectural diagram illustrating a workflow analyzer module, according to an embodiment of the present invention.

FIG. 6 is an architectural diagram illustrating a workflow analyzer module 600, according to an embodiment of the present invention. In some embodiments, the workflow analyzer module 600 is similar to, or the same as, workflow analyzer module 534 illustrated in FIG. 5. Also, in some embodiments, the workflow analyzer module 600 is embodied within the designer 110. Workflow analyzer module 600 includes a data gathering sub-module 610, an analyzer sub-module 620, and a metrics determination module 630, which are executed by processor(s) 520 to perform their specific functionalities to analyze the workflow of the test automation associated with an RPA application.

The data gathering sub-module 610 receives the workflow of the test automation from the designer 110 as a data file. The data file includes, but not limited to, a Solution Design Document (SDD), a Process Design Instruction (PDI), an Object Design Instruction (ODI), or business process (BP) code. For instance, a user or a developer develops the data file of a workflow of test automation using the designer 110. In some embodiments, the data gathering sub-module 610 receives the workflow of the test automation as a combination of a set of test cases. A test case includes a specification of inputs, execution conditions, testing procedure, and expected results that define a single test to be executed to achieve a particular software testing objective, such as to exercise a particular program path or to verify compliance with a specific requirement.

In certain embodiments, the data gathering sub-module 610 provides an enable-option to the user. For example, when the user enables the enable-option, data gathering sub-module 610 obtains one or more test activities (i.e., a sequence) of test automation workflow of an RPA application (for instance, live-data from the user). Further, the test automation workflow or the sequence of the test automation workflow, obtained by the data gathering sub-module 610, is also used by the analyzer sub-module 620.

In some embodiments, the analyzer sub-module 620 includes a training sub-module 622, an Artificial Intelligence (AI) model (hereinafter referred to as "AI model") 624, and a test automation rule sub-module 626. The analyzer sub-module 620 analyzes the workflow of the test automation for outputting an analyzed workflow of the test automation. In some embodiments, the analyzer sub-module 620 uses the AI model 624 for analyzing the received workflow of the test automation.

In some embodiments, the AI model 624 corresponds to a pre-trained AI model that analyzes the received workflow of the test automation. In some embodiments, the AI model 624 is pre-trained based on training data. In some example embodiments, the training data is stored in the training sub-module 622. The training data comprises at least one of standard test automation workflows, errors in test automation workflows, and standard framework documents. The training data also includes sequences within test automation workflows, and all possible flaws (also solutions to tackle the flaws) associated with the test automation workflows. In some example embodiments, the training data is based on previous functional testing of web and mobile applications, visual testing of user interfaces, and UI element location and auto-correcting element selectors. In some embodiments, the flaws include human errors such as a wrong data input for the test automation or missing data input in the test automation. In another example, the AI model 624 predicts flaws associated with the test automation workflow using knowledge of the training data and output the analyzed workflow of the test automation (also called as "analyzed test automation workflow"). The analyzed test automation workflow comprises the workflow of the test automation and the respective predicted flaw information.

In some embodiments, the AI model 624 includes an ML model such as a Recurrent Neural Network model (for instance, a Long Short-Term Memory (LS™) model) and the like. Also, in certain embodiments, the ML model is self-trained. For instance, the ML model is trained to learn one or more patterns in the workflow of test automation. The one or more patterns correspond to recurring tests in previous workflows of the test automation. The ML model provides the one or more patterns to the AI model 624 for the analysis of a workflow of test automation associated with an RPA application. In some example embodiments, the ML model is pre-built ML model stored in the memory 530. In some alternate embodiments, the ML model is customized by the user or accessed from an open platform (e.g., open source community), a third-party organization, or the like. For example, when a flaw occurs in the workflow of the test automation at run-time, the ML model learns the flaw, and then learns a way to tackle the flaw.

In certain embodiments, the AI model 624 uses the test automation rule sub-module 626 for analyzing the received workflow. In some embodiments, the test automation rule sub-module 626 comprises a set of pre-defined test automation instructions (referred to as "a set of pre-defined test automation rules") to analyze the workflow. These set of pre-defined test automation rules comprises a pre-defined number of loops, a pre-defined number of conditions, a structured design, at least one verification point, one or more annotations, a global exception handler, and one or more conditions. The global exceptional handler is associated with unexpected environmental issues. Each of the set of pre-defined test automation rules is associated with each of the set of test cases of the workflow of the test automation.

In some embodiments, the pre-defined number of loops and the pre-defined number of conditions are utilized to validate that test results of each of the set of test cases can be compared over time. Examples of the loops include, "while loop", "do while", "For each loop", and the like. Further, the conditions corresponds to "if condition", "switch condition", and the like. In some embodiments, the structure design includes a Behavior Driven Development (BDD) test design structure with a "Given", "When and Then" section. In some embodiments, each test case of the set of test cases includes at least one verification point.

In some embodiments, the one or more conditions of the set of pre-defined test automation rules are associated with checking of use of similar sequences for several times throughout a test case. Such sequences are extracted into a separate reusable workflow or library. To that end, the analyzer sub-module 620 utilizes this condition to extract one or more redundant sequences of one or more of the set of test cases into a separate reusable library for the analysis of the workflow of the test automation. For instance, two sequences of a test case that are used redundantly for checking a functionality of a module in the workflow of the test automation are extracted as a reusable library for the analysis of the workflow of the test automation. The reusability increases maintainability of the test case for the analysis of the workflow of the test automation. Accordingly, workflow of test automation for RPA applications (such as desktop applications) is analyzed in an efficient and feasible manner.

As should be understood, the test automation rule sub-module 626 executes each rule of the set of pre-defined test automation rules against the workflow of the test automation to output the analyzed workflow of the test automation. The foresaid rules further includes one or more additional rules and one or more additional categories respectively without deviating from the scope of the embodiments. The analyzed workflow comprises the workflow of the test automation and a report comprising validity of the foresaid rules. In some embodiments, the test automation rule sub-module 626 provides a select-option to the user to select one or more rules from the set of pre-defined test automation rules. Further, the test automation rule sub-module 626 executes the selected one or more rules against the workflow of the test automation to output the analyzed workflow of the test automation.

According to some embodiments, the analyzed workflow of the test automation is provided to the metric deterministic sub-module 630 of the workflow analyzer module 600. The metric deterministic sub-module 630 determines one or more metrics associated with the analyzed workflow of the test automation for generating corrective activity data. In some example embodiments, the corrective activity data is stored in a corrective module (not shown in FIG. 6). The corrective activity data is used for performing corrective activity of the analyzed workflow of the test automation.

According to some embodiments, the workflow analyzer module 600 further includes one or more additional modules, e.g., a corrective module (not shown). The corrective module uses the one or more metrics determined by metric determination module 630 to perform one or more corrective activities. In some example embodiments, the corrective activities includes providing feedback to the user regarding better possibility of the workflow or the activity of the test automation, generating a report about the one or more metrics associated with the workflow of the test automation, generating a warning message or an error message associated with the workflow of the test automation at publish time or compile time, or outputting an activity number and an activity name that corresponds to an error activity within the workflow of the test automation. Further, the feedback also allows the user to handle exceptions, validate data, and route AI models (e.g., the AI model 624) for retraining, which provides continuous improvement to the AI model 624.

In some embodiments, the corrective module provides feedback to the user regarding better possibility of the workflow of the test automation. According to some example embodiments, the feedback includes a modified workflow of the test automation or a suggestion message to modify the analyzed workflow of the test automation. The suggestion message comprises assertions or any other information for modifying the workflow of the test automation.

According to some embodiments, the feedback is provided by the AI model 624. For example, the AI model is trained using best practice documents and frameworks (for instance, Robotic Enterprise framework) to build a high quality test automation workflow for RPA applications. In some embodiments, the corrective module generates a report about the metrics associated with the analyzed workflow of the test automation. In some embodiments, the generated report about the metrics is indicated in percentage. In certain embodiments, the corrective module generates a warning message or an error message associated with the analyzed workflow of the test automation. The warning message or the error message includes a summary comprising details or information related to flaws of the analyzed workflow of the test automation.

In some embodiments, the AI model 624 predicts one or more flaws (for instance, wrong input data), in the workflow of the test automation, based on the determined one or more metrics. The one or more metrics include one or more of an extensibility value associated with the analyzed workflow, a maintainability value associated with the analyzed workflow, a readability value associated with the analyzed workflow, a clarity value associated with the analyzed workflow, an efficiency value associated with the analyzed workflow, a cyclomatic-complexity value associated with the analyzed workflow, a reusability value associated with the workflow, a reliability value associated with the analyzed workflow, or an accuracy value associated with the analyzed workflow. In some embodiments, the one or more metrics are displayed (via the display 550) in percentage format. Further, the AI model 624 modifies the workflow of the test automation to remove the one or more flaws.

In this way, the workflow analyzer module 600 performs the foresaid operations, when executed by processor(s) 520, to debug the workflow of the test automation prior to the deployment of the analyzed workflow of the test automation for RPA applications. In some embodiments, the deployment is performed after removal of the flaws. The RPA applications are deployed after the removal of the flaws. This results in designing or developing an accurate test automation workflow for the RPA application, at design stage. The accurate workflow of the test automation comprises least possible instructions to execute the user-defined process (i.e., the workflow with less storage requirement and less execution time). For instance, the workflow analyzer module 600 identifies the flaws (also includes activities that fail the set of rules validation) associated with the workflow and modify the workflow to remove the flaws for designing the accurate workflow of the test automation of the RPA application.

In some embodiments, the workflow analyzer module 600 removes the flaws by use of interleaving technique (e.g., an interleaving code development). Further, the accurate workflow provides improved metrics in comparison to the workflow with flaws (for instance, improvement in the reliability value, the reusability value, the accuracy value, and the like). In some further embodiments, the workflow analyzer 600 integrates with various CI/CD (Continuous Integration and Continuous Deliver) tools and other applications and services for providing timing analysis.

To summarize, workflow analyzer module 600 represents a tool for static code review of existing workflows. For example, workflow analyzer module 600 uses hard-coded, pre-defined rules on how a test automation workflow should look like, and allows for users to define his or her rules base on predefined rules. These predefined rules may include company policies, for example. Additionally, AI model 624

(or AI component) of workflow analyzer module 600 is pretrained on test automation workflows, which are based on a large set of customer data, for example.

In one example, during design time of a workflow, workflow analyzer module 600 analyzes the structure of the workflow and sends a notification regarding potential issues, warning, and improvements. Based on defined rules or policies, these notifications may be suggestions or may prevent a user from publishing the workflow if the workflow does not satisfy the defined rules or policies.

Figure 10:
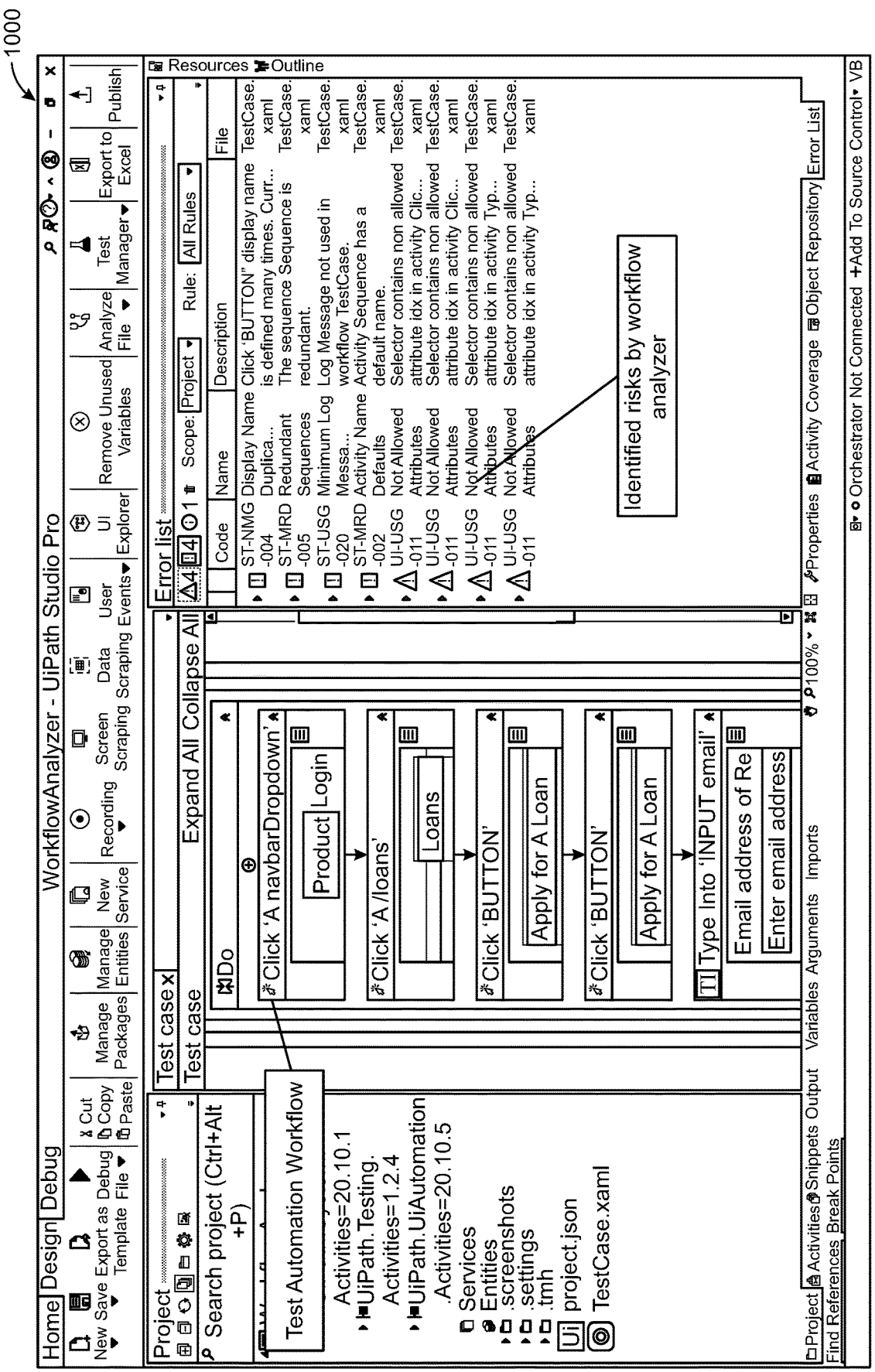
FIG. 10 is a GUI illustrating a designer panel, according to an embodiment of the present invention.

See, for example, FIG. 10, which is a GUI 1000 illustrating a designer panel, according to an embodiment of the present invention. In this embodiment, when workflow analyzer module is triggered, the workflow analyzer module scans the entire workflow and analyzes the workflow for compliance. Based on the predefined rules or policies, the workflow analyzer module compares the workflow against the rules or policies, and generates notifications (e.g., warnings) for those rules or policies that are non-compliant.

It should be appreciated that the predefined rules or policies have been defined upfront by one or more users (e.g., testing experts) based on anecdotal data of past experiences in test automation customer projects. A test case in some embodiments includes at least 1 assertion and a limited number of loops and conditions to make sure that test results can be reliably compared over time. Also, in some embodiments, a test case is atomic and executable without any additional preconditions, and may contain selectors that are not duplicated but rather extracted into an object browser.

It should also be noted that customers may also provide customer-specific rules for the test automation workflow analyzer module. In some embodiments, customers define their own code rules to enforce their company-specific standards and guideline. In this embodiments, every test case should have a log entry for each step and versions within GitHub™.

It should be further noted that certain embodiments includes potential AI pretrained rules for the test automation workflow analyzer. In such an embodiment, the AI algorithm may include a pretrained set of rules. These pretrained set of rules are gathered from a large dataset from existing customer projects. For example, FIG. 11 is a workflow diagram illustrating a system 1100 for continuously updating the database containing the pretrained set of rules, according to an embodiment of the present invention.

Figure 11:
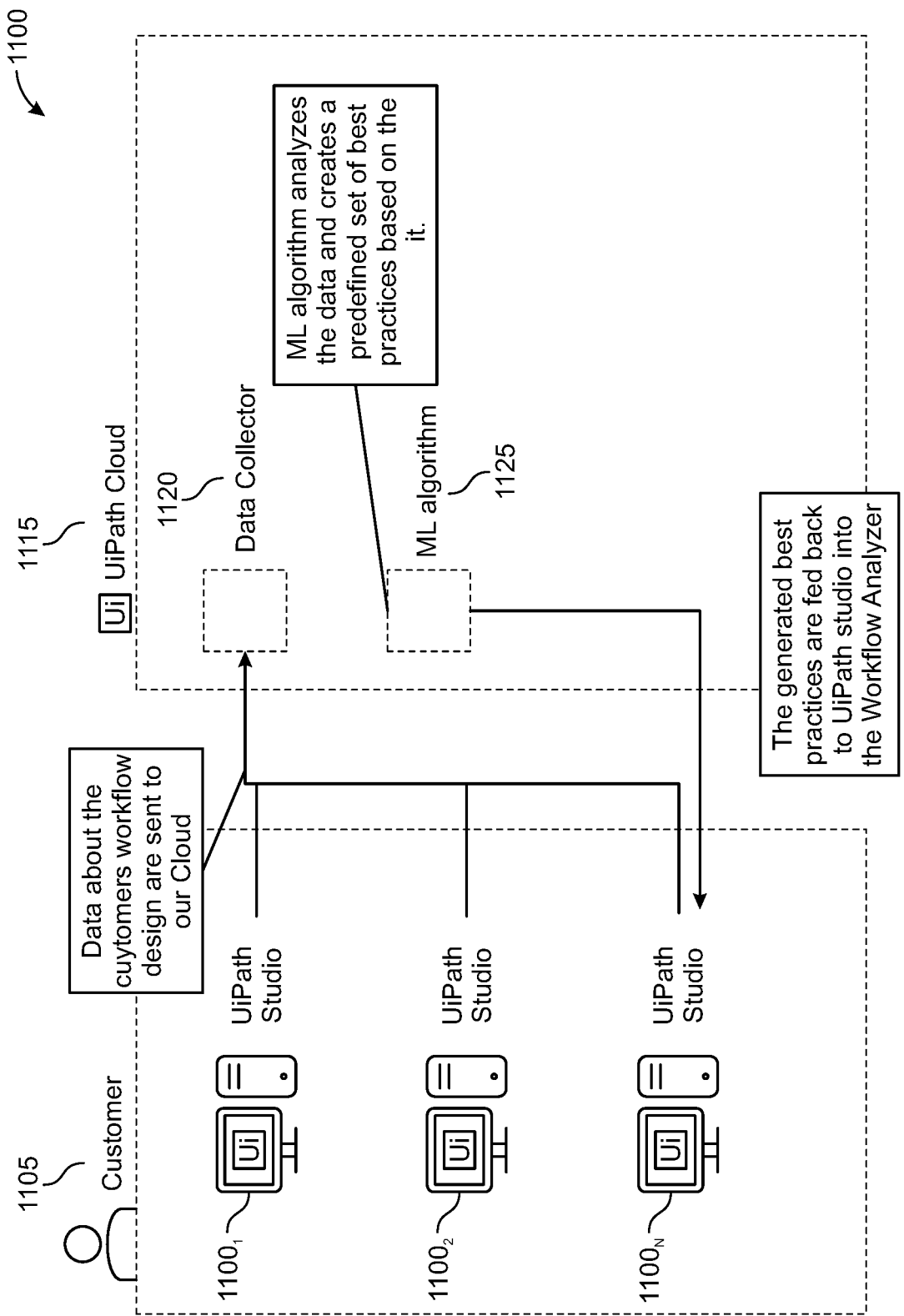
FIG. 11 is a workflow diagram illustrating a system for continuously updating the database containing the pre-trained set of rules, according to an embodiment of the present invention.

As shown in FIG. 11, a customer 1105 may be running a plurality of workflows on various computing systems $1110_1 \ldots 1110_N$ hosting UiPath Studio™. In some embodiments, each computing system $1110_1 \ldots 1110_N$ may continuously transmit data to UiPath cloud 115. UiPath cloud 1115 may include a data collector 1120 and a machine learning (ML) algorithm 1125. Data collector 1120 may collect the data that is being received from each computing system $1110 \ldots 1110_N$. This data includes information about their test automation workflows, which includes information on how the workflow was created, how often the workflow is executed, and so forth. ML algorithm 1125 determines if a stored test automation workflow is good and can be used to derive a rule, for example. In one example, the ML algorithm checks for the following: did the test case at the customer run frequency without any exceptions, how stable was the test case over time, etc. Based on this analysis, the ML algorithm creates the predefined set of rules, allowing the predefined set of rules to be fed back into the test automation workflow analyzer module, which is executed on computing system $1110_1 \ldots 1110_N$.

Figure 7:
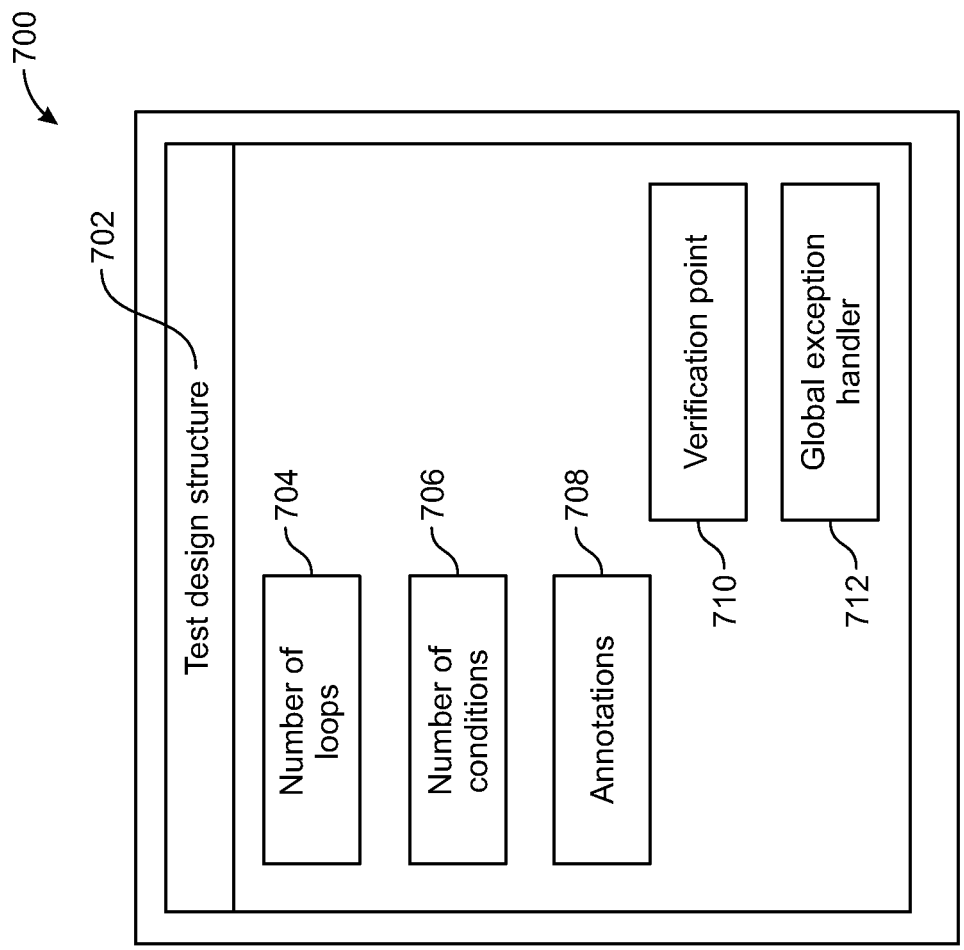
FIG. 7 is a block diagram illustrating a representation depicting a set of pre-defined test automation rules, according to an embodiment of the present invention.

FIG. 7 is a block diagram illustrating a representation 700 depicting a set of pre-defined test automation rules, according to an embodiment of the present invention. In an example embodiment, the set of pre-defined test automation rules comprises a structured design, such as a test design structure 702, a pre-defined number of loops 704, a pre-defined number of conditions 706, annotations 708, one verification point 710, and a global exception handler 712 associated with unexpected environment issues.

Figure 8:
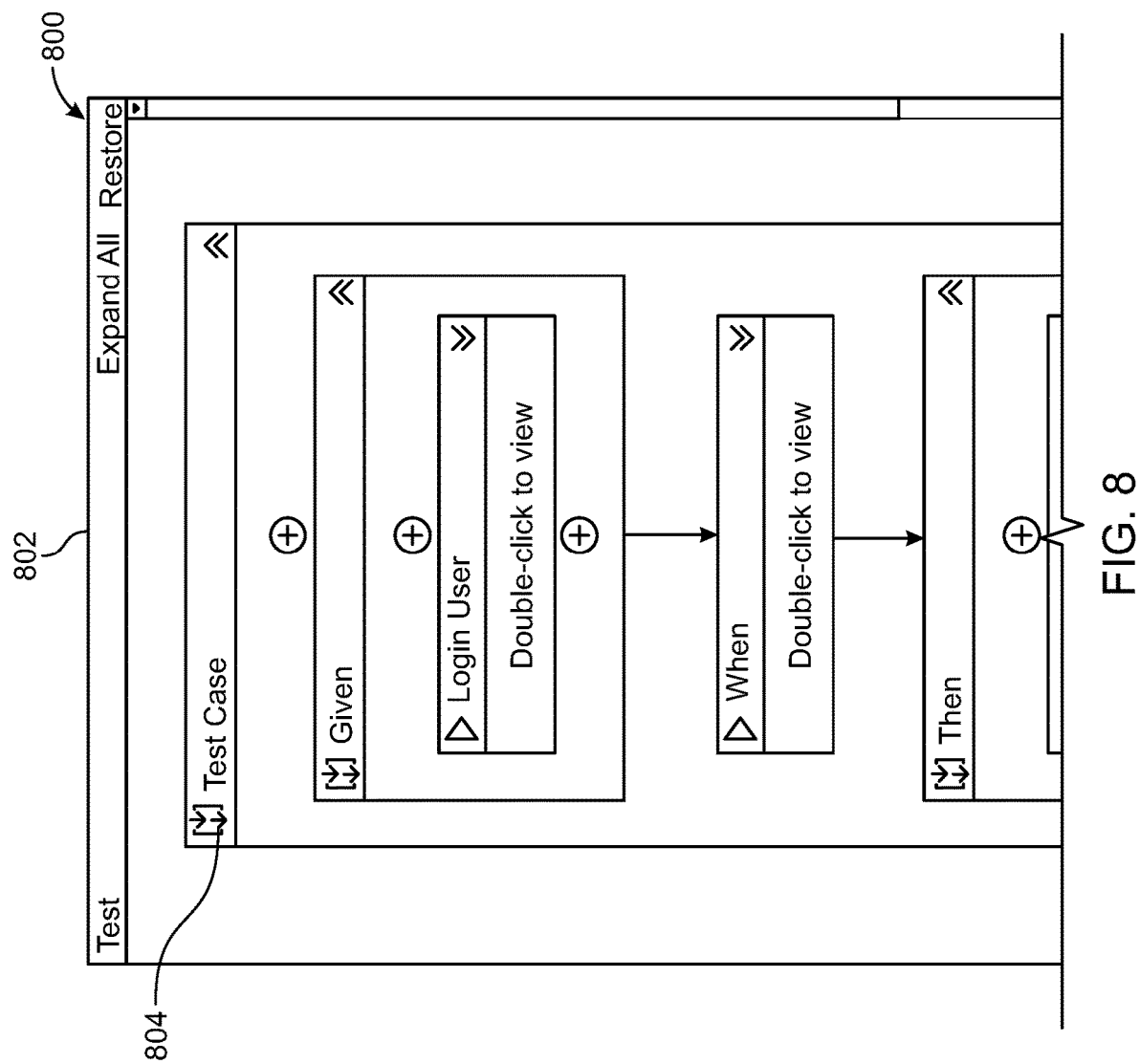
FIG. 8 is a graphical user interface (GUI) illustrating an exemplary user interface for analysis of the workflow of the test automation, according to an embodiment of the present invention.

FIG. 8 is a GUI illustrating a user interface 800 for analysis of a workflow 802 of the test automation, according to an embodiment of the present invention. The workflow 802 comprises a test case or a combination of one or more test cases, for example a test case 804. In some embodiments, the workflow 802 is provided as input (i.e., the workflow from the user) to the computing system 500. The computing system 500 executes the workflow analyzer module 534 to analyze the workflow 700 using the AI model 624. In some example embodiments, the AI model 624 is deployed using a drag-and-drop feature (not shown in FIG. 8) in the UI 800.

Figure 9:
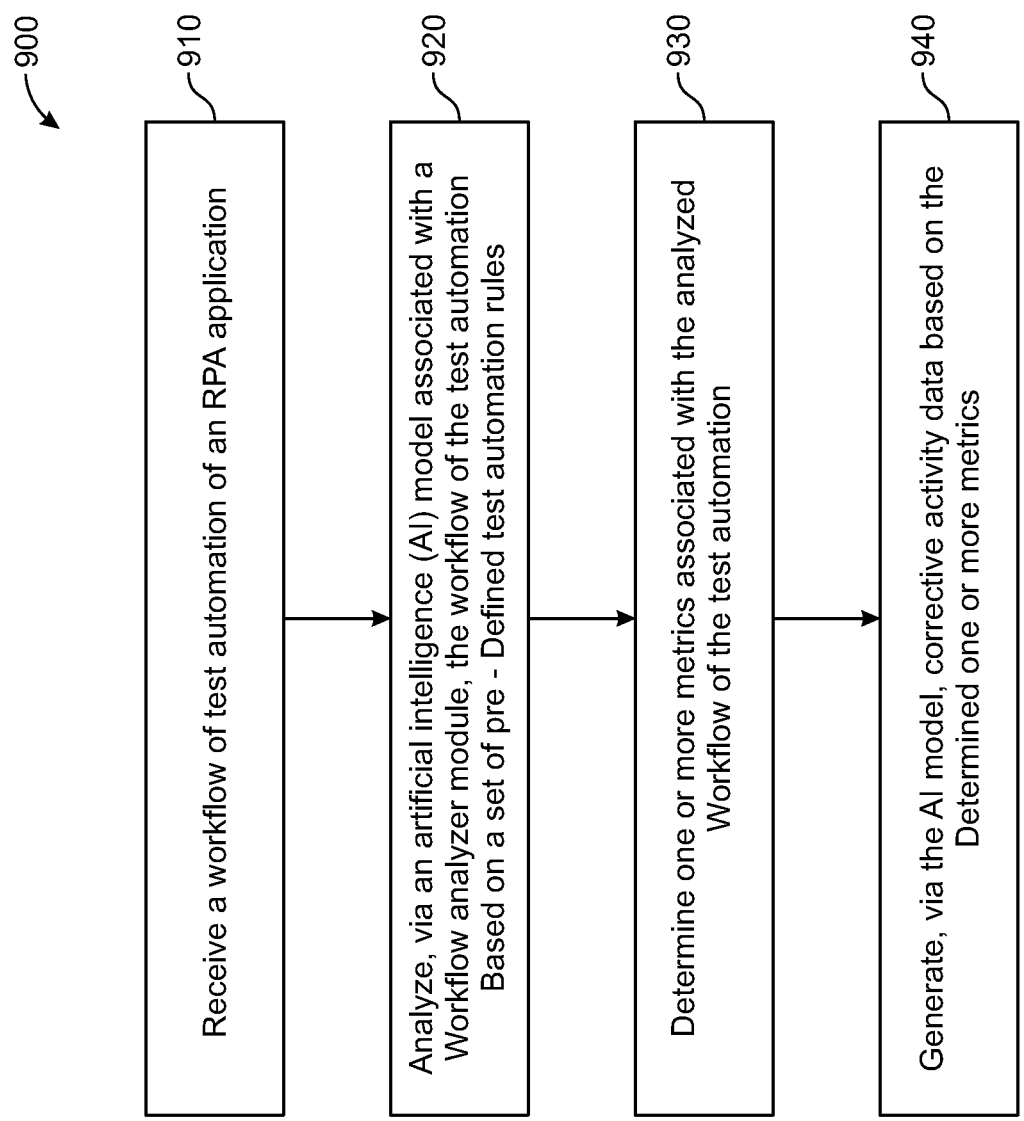
FIG. 9 is a flowchart illustrating a process for analyzing workflow of test automation associated with an RPA application, according to an embodiment of the present invention.

FIG. 9 is a flowchart illustrating a method 900 for analyzing workflow of test automation associated with an RPA application, according to an embodiment of the present invention. In some embodiments, the method 900 begins at step 910.

At step 910, the method 900 includes, receiving the workflow of the test automation of the RPA application. In some embodiments, the workflow for the test automation is obtained as workflow file. The workflow file includes, but not limited to, a Solution Design Document (SDD), a Process Design Instruction (PDI), an Object Design Instruction (ODI), or business process (BP) code. In some other embodiments, the workflow is obtained as one or more activities from the desktop recorder.

At step 920, the method 900 includes, analyzing the workflow of the test automation using an AI model (e.g., the AI model 624) of the workflow analyzer module 600 based on a set of pre-defined test automation rules (e.g., the set of test automation rules 700). In some example embodiments, the AI model 624 corresponds to a pre-trained AI model that includes training data. The training data includes at least one of standard test automation workflows, errors in test automation workflows, and standard framework documents. In some embodiments, the set of pre-defined test automation rules are executed based on the pre-trained AI model.

At step 930, the method 900 includes, determining one or more metrics associated with the analyzed workflow of the test automation. For example, the one or more metrics include one or more of an extensibility value associated with the analyzed workflow, a maintainability value associated with the analyzed workflow, a readability value associated with the analyzed workflow, an efficiency value associated with the analyzed workflow, cyclomatic-complexity value associated with the analyzed workflow, or an accuracy value associated with the analyzed workflow.

At step 940, method 900 includes, generating, via the AI model, corrective activity data based on the one or more metrics. In some embodiments, the corrective activity data is used for performing corrective activity for the workflow of the test automation. The corrective activity comprises predicting, via the AI model one or more flaws in the workflow of the test automation based on the determined one or more metrics and modifying, via the AI model, the workflow to remove the one or more flaws.

The process steps performed in FIG. 9 are performed by a computer program, encoding instructions for the processor(s) to perform at least part of the process(es) described in FIG. 9, in accordance with embodiments of the present invention. The computer program is embodied on a non-transitory computer-readable medium. The computer-readable medium is, but not limited to, a hard disk drive, a flash device, RAM, a tape, and/or any other such medium or combination of media used to store data. The computer program includes encoded instructions for controlling processor(s) of a computing system (e.g., processor(s) 520 of computing system 500 of FIG. 5) to implement all or part of the process steps described in FIG. 9 which is also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, are arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification are combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics are combined in any suitable manner in one or more embodiments.

It should be noted that reference throughout this specification to features, advantages, or similar language does not imply that all of the features and advantages that are realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification, but do not necessarily, refers to the same embodiment.

Furthermore, the described features, advantages, and characteristics of the invention are combined in any suitable manner in one or more embodiments. One skilled in the relevant art will recognize that the invention can be practiced without one or more of the specific features or advantages of a particular embodiment. In other instances, additional features and advantages are recognized in certain embodiments that are not present in all embodiments of the invention.

One having ordinary skill in the art will readily understand that the invention as discussed above is practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for analyzing workflow of test automation associated with a robotic process automation (RPA) application, the method comprising:
   receiving the workflow of the test automation associated with the RPA application;
   analyzing, via an artificial intelligence (AI) model associated with a workflow analyzer module, the workflow of the test automation based on a set of pre-defined test automation rules, wherein the analyzing of the workflow of the test automation comprises
   training a machine learning (ML) model to learn one or more patterns in the workflow of the test automation, the one or more patterns in the workflow of the test automation corresponding to recurring tests in previous workflows of the test automation, and
   providing the one or more patterns in the workflow of the test automation to the AI model for analysis of the workflow of the test automation associated with the RPA application;
   determining one or more metrics associated with the analyzed workflow of the test automation; and
   generating, via the AI model, corrective activity data based on the determined one or more metrics.

2. The method of claim 1, wherein the set of pre-defined test automation rules comprises at least one of a pre-defined number of loops, a pre-defined number of conditions, a pre-defined structured design, or at least one verification point.

3. The method of claim 1, further comprising performing corrective activity, for the analyzed workflow of the test automation, based on the corrective activity data.

4. The method of claim 3, wherein performing the corrective activity further comprises:
   predicting, via the AI model, one or more flaws in the workflow of the test automation based on the determined one or more metrics; and
   modifying, via the AI model, the workflow of the test automation to remove the one or more flaws.

5. The method of claim 1, wherein the workflow of the test automation comprises a combination of a set of test cases.

6. The method of claim 5, further comprising extracting one or more redundant sequences of at least one test case of the set of test cases into a separate reusable library for the analysis of the workflow of the test automation.

7. The method of claim 5, further comprising creating data-driven test automation based on a difference between a first test case of the set of test cases and a second test case of the set of test cases during data processing of the set of test cases.

8. The method of claim 1, wherein AI model corresponds to a pre-trained AI model that includes training data.

9. The method of claim 8, wherein analyzing the workflow of the test automation further comprises executing the set of pre-defined test automation rules based on the pre-trained AI model.

10. The method of claim 8, wherein the training data comprises at least one of standard test automation workflows, errors in test automation workflows, and standard framework documents.

11. A system for analyzing workflow of test automation associated with a robotic process automation (RPA) application, the method comprising:
a memory configured to store instructions; and
at least one processor, wherein
the instructions are configured to cause the at least one processor to:
receive the workflow of the test automation associated with the RPA application;
analyze, via an artificial intelligence (AI) model associated with a workflow analyzer module, the workflow of the test automation based on a set of pre-defined rules, wherein the analyze of the workflow of the test automation includes
train a machine learning (ML) model to learn one or more patterns in the workflow of the test automation, the one or more patterns in the workflow of the test automation corresponding to recurring tests in previous workflows of the test automation, and
provide the one or more patterns in the workflow of the test automation to the AI model for analysis of the workflow of the test automation associated with the RPA application;
determine one or more metrics associated with the analyzed workflow of the test automation; and
generate, via the AI model, corrective activity data based on the determined one or more metrics.

12. The system of claim 11, wherein the set of pre-defined test automation rules comprises at least one of a pre-defined number of loops, a pre-defined number of conditions, a pre-defined structured design, or at least one verification point.

13. The system of claim 11, wherein the at least one processor is further configured to execute the instructions to:
perform corrective activity, for the analyzed workflow of the test automation, based on the corrective activity data.

14. The system of claim 13, wherein to perform the corrective activity, the at least one processor is further configured to execute the instructions to:
predict, via the AI model, one or more flaws in the workflow of the test automation based on the determined one or more metrics; and
modify, via the AI model, the workflow of the test automation to remove the one or more flaws.

15. The system of claim 11, wherein the workflow of the test automation comprises a combination of a set of test cases.

16. The system of claim 15, wherein the at least one processor is further configured to execute the instructions to extract one or more redundant sequences of at least one test case of the set of test cases into a separate reusable library for the analysis of the workflow of the test automation.

17. The system of claim 15, wherein at least one processor is further configured to create data-driven test automation based on a difference between a first test case of the set of test cases and a second test case of the set of test cases during data processing of the set of test cases.

18. The system of claim 11, wherein AI model corresponds to a pre-trained AI model that includes training data, wherein training data comprises at least one of standard test automation workflows, errors in test automation workflows, and standard framework documents.

19. The system of claim 18, wherein to analyze the workflow of the test automation, the at least one processor is are further configured to execute the set of pre-defined test automation rules based on the pre-trained AI model.

20. A computer program embodied on a non-transitory computer-readable medium, wherein the computer program is configured to cause at least one processor to:
receive the workflow of the test automation associated with the RPA application;
analyze, via an AI model associated with a workflow analyzer module, the workflow of the test automation based on a set of pre-defined test automation rules, wherein the analyzing of the workflow of the test automation comprises
train a machine learning (ML) model to learn one or more patterns in the workflow of the test automation, the one or more patterns in the workflow of the test automation corresponding to recurring tests in previous workflows of the test automation, and
provide the one or more patterns in the workflow of the test automation to the AI model for analysis of the workflow of the test automation associated with the RPA application;
determine one or more metrics associated with the analyzed test automation; and
generate, via the AI model, corrective activity data based on the determined one or more metrics.

* * * * *